United States Patent
Tanaka et al.

[19]

[11] Patent Number: 6,062,246
[45] Date of Patent: *May 16, 2000

[54] MASS FLOW CONTROLLER AND OPERATING METHOD THEREOF

[75] Inventors: Makoto Tanaka; Yasuo Sakaguchi; Yasukazu Tokuhisa, all of Mie-ken, Japan

[73] Assignee: Hitachi Metals Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/053,780

[22] Filed: Apr. 2, 1998

[30] Foreign Application Priority Data

| Apr. 8, 1997 | [JP] | Japan | 9-089005 |
| Aug. 11, 1997 | [JP] | Japan | 9-216058 |
| Sep. 17, 1997 | [JP] | Japan | 9-251686 |

[51] Int. Cl.[7] ............................................. E03B 1/00
[52] U.S. Cl. .................... 137/12; 137/487.5; 137/614.21
[58] Field of Search ........................... 137/487.5, 614.21, 137/120, 14; 251/331

[56] References Cited

U.S. PATENT DOCUMENTS

| 2,031,478 | 2/1936 | Gray ................................ 137/487.5 |
| 4,977,916 | 12/1990 | Ohmi et al. ............................ 137/8 |
| 5,108,069 | 4/1992 | Tada et al. ........................ 251/331 X |
| 5,269,341 | 12/1993 | Nusz et al. ........................ 137/487.5 |
| 5,421,365 | 6/1995 | Matsuo et al. ........................ 137/599 |
| 5,464,038 | 11/1995 | Kruto .............................. 137/487.5 X |
| 5,664,759 | 9/1997 | Evans et al. .................... 137/614.21 X |

*Primary Examiner*—Denise L. Ferensic
*Assistant Examiner*—Joanne Y. Kim
*Attorney, Agent, or Firm*—Sughrue, Mion, Zinn, Macpeak & Seas, PLLC

[57] ABSTRACT

A mass flow controller having a shut off valve in a flow path body as an integral part. The mass flow controller minimize a dead space between the shut off valve and a mass flow control valve to reduce the amount of entrapped gas therein, thereby avoiding occurrence of overshoot in the initiation of the next mass flow control operation. In another aspect, a bypass passage is provided in the flow path body. The bypass passage bypasses a sensor flow path, a bypass flow path and a mass flow control valve which increase a flow resistance, and therefore, a large amount of purge gas can be passed through the bypass passage in a short time. In still another aspect, a sealing surface of a valve seat is made into coplanar with the top surface of the flow path body, thereby making the sealing surface and the top surface of the body possible to be simultaneously subjected to lapping finish. This enhances the parallel relation between the sealing surface and the top surface of the body and makes it easy to align the axis of an actuator with the axes of other parts.

18 Claims, 12 Drawing Sheets

MASS FLOW CONTROLLER AND OPERATING METHOD THEREOF

BACKGROUND OF THE INVENTION

The present invention relates to a mass flow controller for controlling a mass flow of a fluid such as a gas, and particularly a mass flow controller precisely controlling from a small amount of mass flow to a large amount of mass flow and an operating method thereof.

In the production of semiconductor devices, the film-forming process, etching treatment, etc. are carried out in a confined chamber by precisely controlling the mass flow of a small amount of a process gas. As the means for controlling the mass flow, a mass flow controller has been generally used.

FIG. 10 is a vertical sectional view showing a conventional mass flow controller 101. As seen from FIG. 10, the conventional mass flow controller 101 mainly comprises a sensor means 102 for detecting the mass flow of a fluid (hereinafter described on a gas as the example of the fluid), a mass flow control valve means 104 equipped with an actuator 140, and a control circuit 103 (details are not shown) for electrically controlling the mass flow control valve means 104 and the actuator 140. A gas introduced from a fluid inlet 111 passes through an inlet flow path 112, at which the flow path is branched to a by-pass flow path 116 and a sensor flow path 120. A major portion of the introduced gas passes through the by-pass flow path 116, and the amounts of gas passing through the by-pass flow path 116 and the sensor flow path 120 are regulated in a predetermined ratio. The gases passing through the respective branched flow paths 116 and 120 are combined again at an intermediate flow path 113. The combined gas flows into a fluid outlet 114 by passing through a valve seat 143 and an outlet flow path 115.

The sensor flow path is a U-shaped stainless tube of an internal diameter about 0.5 mm, and the upstream end thereof is in fluid communication with the inlet flow path 112 and the downstream end with the intermediate flow path 113. The sensor flow path 120 has an upstream heat-sensitive coil 121 and a downstream heat-sensitive coil 122 each wound around the sensor flow path 120, both the heat-sensitive coils constituting a bridge circuit (not shown) together with resistances. The sensor means 102 comprises these elements of the sensor flow path 120, the upstream and downstream heat-sensitive coils 121 and 122 and the bridge circuit. Since the heat-sensitive coils is maintained at a predetermined temperature higher than that of the gas flowing into the sensor flow path 120, the upstream heat-sensitive coil 121 loses heat when the gas passes through sensor flow path 120 to lower the temperature thereof. Then, the heated gas raises the temperature of the downstream heat-sensitive coil 122 to create a temperature difference between the heat-sensitive coils 121 and 122. Such a heat transfer is detected as an unbalanced voltage in the bridge circuit. The mass flow is thus measured because the detected potential difference is proportional to the mass flow.

The mass flow signal from the sensor means 102 is amplified by an amplifier circuit and input to the controlling circuit 103 where the mass flow signal is compared with a preset mass flow level and, if there is a difference between them, a driving signal (valve driving voltage) to minimize the difference is put to the actuator 140, thereby regulating the mass flow by the mass flow controlling valve means 104.

The degree of valve opening is controlled by the upward and downward motion of the actuator 140, which moves a metal diaphragm 142 toward or away from the sealing surface of a valve seat 143. Since the flow rate of the gas is usually small, the degree of valve opening is adjusted by the stroke of the upward and downward motion as small as about 10 $\mu$m. Therefore, a piezo element stack has been used as the actuator 140 because a large thrust can be obtained by a small stroke of the motion. The mass flow control valve means 104 comprises the valve seat 143 disposed at the downstream end of the intermediate flow path 113, the metal diaphragm 142 for controlling the outlet opening of the valve seat 143, a valve rod 141 for pressing the diaphragm 142 interiorly including the actuator (piezo element stack) 140, and a spring means 146 for press contacting the valve rod 141 via the diaphragm 142 onto the sealing surface of the valve seat 143 thereby maintaining the valve closed before the control operation. The diaphragm 142 is a thin metal sheet having a flat central area and an annular spring portion having a semicircular cross section surrounding the flat central area. With the spring portion, the diaphragm 142 has a self-restoring force. The periphery of the diaphragm 142 is held by a press member. The upper end of the actuator 140 is fixed to a position adjusting member 145, and the lower end is abuttingly supported by a bridge member 144 which is fixedly mounted to a flow path body 110.

Upon applying a voltage to the actuator 140, the piezo element stack expands upward against the downward force from the spring means 146 because the lower end of the piezo element stack is supported on the bridge member 144. The upward expansion of the piezo element stack moves the valve rod 141 upward to reduce the pressing force of the lower end of the valve rod 141 applied on the diaphragm 142. As a result thereof, the diaphragm 142 tightly contacted to the sealing surface of the valve seat 143 is allowed to separate therefrom by its self-restoring force to increase the degree of the valve opening, thereby controlling the mass flow. The above description and FIG. 10 are made on a normally closed valve, and the fundamental functions are the same also in a normally opened valve.

The production process of semiconductor devices includes a step of completely shutting off the flow of the gas. Although the mass flow controlling valve is effective for controlling a small flow mass, not sufficient for completely shutting-off the fluid flow. Since the conventionally known mass flow controller does not completely shut off the fluid flow, it has been proposed, as shown in FIG. 11, to provide a mass flow controller M with a separate shut off valve assembly V operated manually or by air-cylinder in series at a downstream side thereof. In the proposed apparatus, an amount of gas gradually leaked from the mass flow control valve during the shut off mode is entrapped in a flow path F between the mass flow controller M and the shut off valve assembly V. The entrapped gas adversely affects the next mass flow control operation. For example, an excessively large amount of flow (overshoot flow) occurs immediately after the shut off valve is reopened in the next operation, and it takes a non-negligible time until the mass flow reaches the control point as shown in (b2) of FIG. 4(b). Thus, the entrapped gas deteriorates the response of the mass flow controller. To avoid the overshoot flow, the conventional process includes an additional step for expelling the entrapped gas from the flow path F just prior to the initiation of a next control. Also, when a different gas is used in the next control operation, an additional time for purging the flow path F is required.

In addition, the provision of the shut off valve assembly V increases the geometric size of the apparatus. The increase in the geometric size is unfavorable because an apparatus for producing semiconductor devices requires to put the pipeline arrangement including mass flow controller together in a cylinder cabinet.

Further, in the apparatus mentioned above, the mass flow controller 101 is controlled electrically by a control signal from the control circuit 103 and the shut off valve 105 is controlled pneumatically by an open-closes action of a solenoid valve. Such a control by different control systems makes a simultaneous control of the mass flow control and the open-close control of the shut off valve difficult. Therefore, a timing lag in the mass flow control and the open-close control of the shut off valve occurs to cause the overshoot flow.

The production process of semiconductor devices includes a step of supplying a process gas of a precise and small mass flow such as 1±0.01 SCCM ($cm^3$/min at standard conditions) and a step of supplying an inert gas such as nitrogen of a great mass flow as large as about 20,000 SCCM to purge the flow paths of the mass flow controller. To conduct both the small mass flow step and the large mass flow step, an apparatus as shown in FIG. 12 has been proposed. As seen from FIG. 12, a mass flow controller 101 having a maximum controllable mass flow of about 1 SCCM has a bypass line 106 which is connected in parallel to the mass flow controller 101 so that the bypass line 106 bypasses the mass flow controller 101. The small mass flow control and the large mass flow purge are switched by opening or closing a shut off valve 105. However, the apparatus of FIG. 12 is large in its geometric size due to the auxiliary bypass line 106 and not suitable for use in the production of semiconductor device as mentioned above.

To eliminate the above problem, U.S. Pat. No. 5,421,365 proposes in FIG. 5 a flow control apparatus in which a bypass passage 48 is formed in the base block 40 for connecting a first passage 45 (intermediate flow path) and a second gas passage 46 (outlet flow path downstream the mass flow control valve), and a valve mechanism 49 (shut off valve) for opening and closing the bypass passage is provided in the inlet portion of the bypass passage. The bypass passage is used for passing a purging gas such as nitrogen to flow away the gas remaining in the pipe 23, and the first and second gas passages 45 and 46 when the gas flow adjusting mechanism 44 is troubled by a clogging, etc. When a trouble occurs in the gas flow adjusting mechanism 44, the valve mechanism 49 is opened so as to communicate the bypass passage 48 with the first and second gas passages 45 and 46. A part of the purge gas passing through the first gas passage 45 flows into the pipe 51 (sensor flow path) with small bore of the gas flow sensor 43.

Generally, the diameter of the bypass flow path is determined so as to ensure that a flow passing through the sensor flow path has a mass flow level sufficient for detecting when the mass flow is the maximum controllable mass flow. Therefore, the number of tubes of the bypass flow path is decreased with decreasing maximum controllable mass flow. For example, a mass flow controller having a small maximum controllable mass flow of about 1 SCCM has generally no bypass flow path, and all part of the gas passes through the sensor flow path. Since the sensor flow path has a small bore size and creates a large flow resistance, the mass flow controller cannot be purged by a sufficient amount of purge gas in a short period of time because of the large flow resistance. Therefore, in such a mass flow controller of a small maximum controllable mass flow, the flow paths cannot be purged sufficiently and a part of the process gas still remains in the flow paths of the mass flow controller or the pipe lines connected thereto. The remaining process gas is mixed with another process gas in the next production step and adversely affects the quality of semiconductor devices being produced.

Since the bypass passage 48 of U.S. Pat. No. 5,421,365 connects the first passage 45 (intermediate flow path) and the second gas passage 46 (outlet flow path), at least a part of the purge gas must flow through the sensor flow path having a small bore size to remarkably increase the flow resistance. This prevents the flow of a large amount of purge gas through the mass flow controller in a short time to result in an insufficient purge of the flow paths.

Further, the valve mechanism 49 of U.S. Pat. No. 5,421,365 merely controls on or off of the fluid flow passing through the bypass passage 48 when a trouble is happened in the main flow through the gas flow adjusting mechanism 44, and cannot avoid the problem of overshoot flow mentioned above because the valve mechanism 49 does not participate in shutting off the main flow of the gas from the fluid inlet to the fluid outlet through the gas flow adjusting mechanism 44.

Generally, the sealing surface of the valve seat is mirror-polished by lapping, and the valve seat thus finished is screwed or caulked to the flow path body. The sealing surface sometimes fails to being in parallel relation to the surface of the flow path body around thereof due to the inaccurate dimension of the valve seat and the uneven deflection of the valve seat from a proper fitting position. If not in parallel relation, a press means for holding the diaphragm and a bridge means are mounted inclined with respect to the sealing surface. Therefore, the uniform abutting of the metal diaphragm against the sealing surface cannot be obtained and the stroke of motion of the piezo element stack cannot be effectively transmitted to the metal diaphragm. Since the stroke is very small of micron order, the failure in transmitting the motion significantly affects the control of the mass flow utilizing the elastic deformation of diaphragm. Also, the inclined abutting of the diaphragm on the sealing surface of the valve seat deteriorates the accuracy of the mass flow control.

OBJECT AND SUMMARY OF THE INVENTION

Accordingly, an object of the present invention is to solve the problems mentioned above and provide a mass flow controller capable of completely shutting off the main flow of fluid from a fluid inlet to a fluid outlet through a mass flow control valve and further a mass flow controller capable of allowing a large amount of purging gas to flow therethrough in a short time. Another object of the present invention is to provide a mass flow controller having a mass flow control valve means in which parts are stacked in parallel to the sealing surface of the valve seat so as to ensure a good alignment between the axis of the actuator and the axes of the valve seat, diaphragm, etc., thereby improving the accuracy of the mass flow control and the response. Still another object of the present invention is to provide an operating method of such mass flow controllers.

Thus, in a first aspect of the present invention, there is provided a mass flow controller comprising (a) a flow path body having therein an inlet flow path which is branched into a sensor flow path and a bypass flow path, an intermediate flow path in fluid communication with downstream ends of the bypass flow path and the sensor flow path, a downstream end of the intermediate flow path being connected to a mass flow control valve, and an outlet flow path for flowing a fluid from the mass flow control valve; (b) a sensor means for detecting a mass flow of a fluid passing through the sensor flow path; (c) a control circuit for controlling the mass flow control valve and the sensor means; wherein a shut off valve for opening or closing a flow path from the mass flow control valve to the outlet flow path is disposed in the flow path body.

The above mass flow controller is characterized in that a shut off valve is integrally disposed in the flow path body to open or close the flow path from the mass flow control valve to the outlet flow path. Such a shut off valve is clearly different from the valve mechanism taught in U.S. Pat. No. 5,421,365 discussed above because the prior art valve mechanism opens or closes the bypass passage connecting the first passage (intermediate flow path) and the second passage (outlet flow path) to bypass the flow adjusting valve, whereas the shut off valve of the invention shuts off the flow from the mass flow control valve. With the shut off valve of the invention, the fluid flow passing through the main flow path can be completely shut off. The main flow path referred to herein is a flow path from the inlet flow path to the outlet flow path through the bypass/sensor flow paths, the intermediate flow path and the mass flow control valve in this order. Since the shut off valve is integrally disposed in the flow path body including the main flow path, the flow path between the mass flow control valve to the shut off valve (dead space) is short to significantly reduce the amount of the entrapped gas in the dead space. Thus, the problems of the overshoot flow and the waste gas in the dead space as mentioned above can be eliminated by the shut off valve disposed after the mass flow control valve and before the fluid outlet. In addition, the incorporation of the shut off valve in the flow path body as an integral part makes the mass flow controller compact and small in its geometric dimension.

In a second aspect of the present invention, there is provided a mass flow controller comprising (a) a flow path body having therein an inlet flow path which is branched into a sensor flow path and a bypass flow path, an intermediate flow path in fluid communication with downstream ends of the bypass flow path and the sensor flow path, a downstream end of the intermediate flow path being connected to a mass flow control valve, and an outlet flow path for passing a fluid from the mass flow control valve; (b) a sensor means for detecting a mass flow of a fluid passing through the sensor flow path; and (c) a control circuit for controlling the mass flow control valve and the sensor means; wherein a bypass passage for communicating the inlet flow path and the outlet flow path having a shut off valve for opening or closing the bypass passage is disposed in the flow path body.

The most characteristic feature of the above mass flow controller is the bypass passage connecting the inlet flow path before branching into the sensor flow path and the bypass flow path and the outlet flow path after the mass flow control valve. The bypass passage of the invention is clearly distinguished form the bypass passage taught by U.S. Pat. No. 5,421,365 because the prior art bypass passage does not bypass the sensor flow path and the bypass flow path. With the above mass flow controller, since the sensor flow path and the bypass flow path are bypassed, a large amount of the purging gas can be passed through the mass flow controller to ensure a sufficient purge. Further, since the mass flow controller can be constructed from a decreased number of the pipe line parts such as pipe fitting, pipe joint, etc., the production cost and the geometric dimension can be reduced.

In a third aspect of the present invention, there is provided a method of operating the mass flow controllers as mentioned above.

In the above method, both the signal from the switcher for controlling the on-off function of the shut off valve, such as an electro-magnetic valve for opening or closing an air flow, and the mass flow signal from the sensor means are input to the control circuit and processed therein into a single control signal. Therefore, the degree of opening of the mass flow control valve and the timing of opening or closing the shut off valve are simultaneously controlled by a single electrical control signal. In addition, since the length of the tube connecting the press means for controlling the on-off function of the shut off valve and the electro-magnetic valve can be precisely adjusted to a predetermined length, an unintended time lag between both the controls can be minimized.

In a fourth aspect of the present invention, there is provided a mass flow controller comprising (a) a flow path body having therein an inlet flow path which is branched into a sensor flow path and a bypass flow path, an intermediate flow path in fluid communication with downstream ends of the bypass flow path and the sensor flow path, a downstream end of the intermediate flow path being connected to a mass flow control valve, and an outlet flow path for passing a fluid from the mass flow control valve means, said mass flow control valve comprising (1) a valve seat disposed at the downstream end of the intermediate flow path and received in a recess on the top of the flow path body and (2) a metal diaphragm having a central flat area and disposed so as to adjust the degree of opening of the valve seat by moving toward and away from a sealing surface of the valve seat, the moving of the diaphragm being operated by an actuator assembly by applying or removing a pressure on the diaphragm, a lower portion of the actuator assembly being located on the diaphragm; (b) a sensor means for detecting a mass flow of a fluid passing through the sensor flow path; and (c) a control circuit for controlling the mass flow control valve and the sensor means; the sealing surface of the valve seat being made coplanar with a top surface of the flow path body at least around the recess.

With the above configuration, the sealing surface of the valve seat and the top surface of the flow path body surrounding the valve seat can be simultaneously finished by lapping in a single step. Therefore, the sealing surface and the top surface of the flow path body can be made coplanar even when there exists an inaccuracy in the geometric dimension of the valve seat and even when the valve seat is mounted out of the proper position. Since the metal diaphragm, the press member for holding the metal diaphragm, etc. are stacked on the coplanarly finished sealing surface and surface of the flow path body, the actuator is properly mounted coaxially with the valve seat and the metal diaphragm. This allows the stroke of the actuator motion to be accurately transmitted to the metal diaphragm. Further, since the diaphragm is parallel to the sealing surface, a precise control of the degree of opening can be attained.

DETAILED DESCRIPTION OF THE INVENTION

Figure 1:
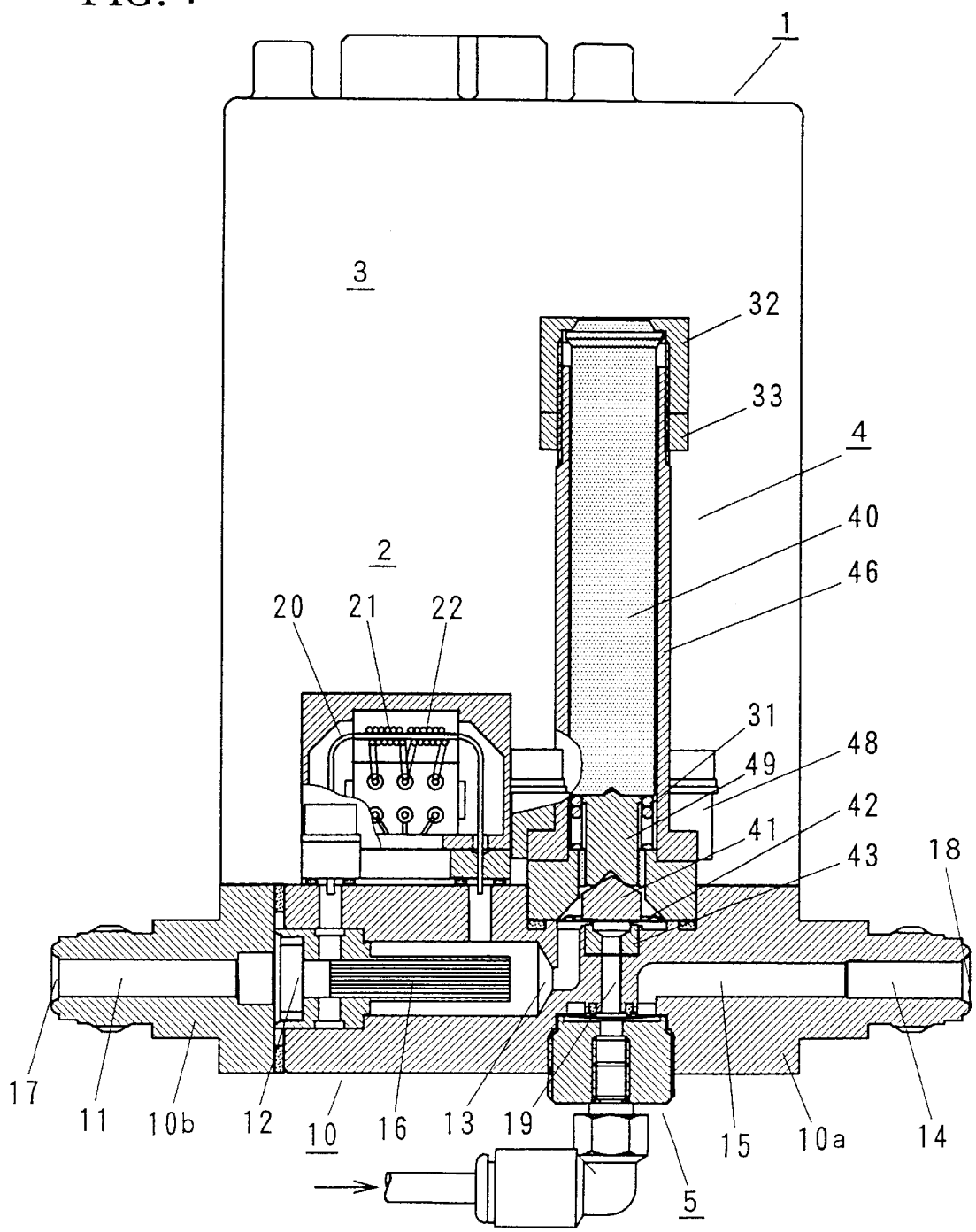
FIG. 1 is a vertical cross sectional view showing a first embodiment of the mass flow controller of the present invention.

The present invention will be described in more detail with reference to the accompanying drawings, in which like reference numerals indicate like parts.

Figure 2:
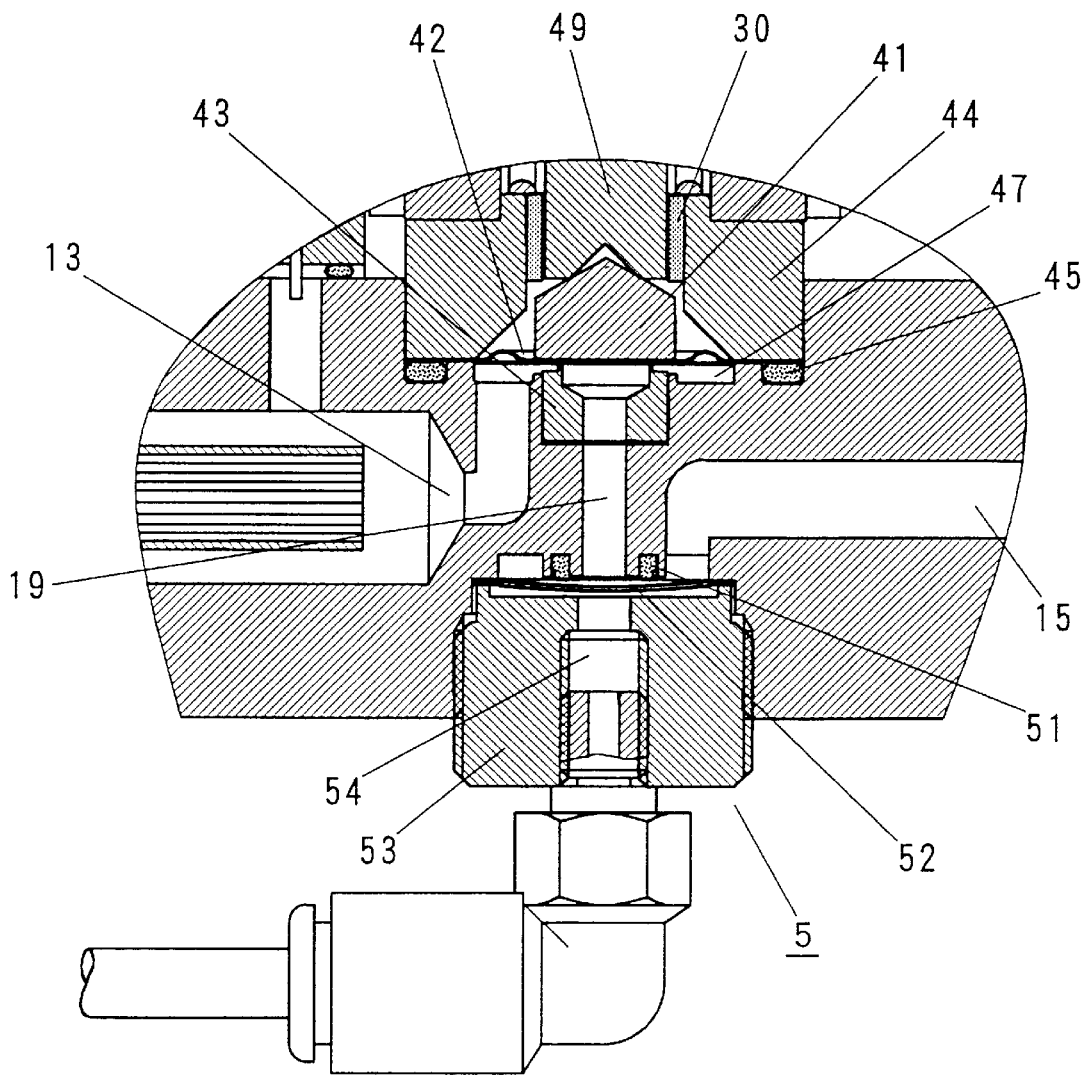
FIG. 2 is an enlarged view showing an important part of FIG. 1.

FIG. 1 is a vertical cross sectional view showing a first preferred embodiment of the mass flow controller of the present invention, which has a shut off valve for opening or closing the main flow path of fluid. FIG. 2 is an enlarged view of the characteristic part of FIG. 1. In the following description, the present invention will be described on a normally opened mass flow controller. However, it should be construed that the principles of the present invention may be easily applied to a normally closed mass flow controller.

As seen from FIG. 1, the first preferred mass flow controller 1 of the present invention basically comprises a sensor means 2, an actuator assembly 4, a control circuit 3 (details not shown), a mass flow control valve comprising the parts 42 and 43 and a flow path body 10 including a main flow path comprising a fluid inlet 11, an inlet flow path 12, bypass/sensor flow paths 16, 20, an intermediate flow path 13, the mass flow control valve, an intervalve flow path 19, a shut off valve 5, an outlet flow path 15, and a fluid outlet 14 in this order.

The flow path body 10 comprises an outlet part 10a having an outlet joint and an inlet part 10b having an inlet joint and made of a stainless steel such as SUS316L, etc. A fluid introduced into an inlet 17 passes through the fluid inlet 11 in the inlet part 10b and the inlet flow path 12, at which the fluid flow is divided into two flows to enter into the bypass flow path 16 and the sensor flow path 20. The divided flows are combined in the intermediate flow path 13. The downstream end of the intermediate flow path 13 is connected to the mass flow control valve which comprises a valve seat 43, a metal diaphragm 42 and a valve chamber 47. From the valve chamber 47, an intervalve flow path 19 extends downward. The valve seat 43 made of a metallic material such as stainless steel (SUS316L), etc. is caulked or screwed in the intervalve flow path 19. The metal diaphragm 42 is disposed opposite to a sealing surface of the valve seat 43 so as to close contact with or separate from the sealing surface, thereby adjusting the communication of the intermediate flow path 13 with the intervalve flow path 19. The geometric shape of the diaphragm 42 as the valve body is not restricted to a thin plate as shown in FIGS. 1 and 2, and may be a bridge diaphragm or disk diaphragm, a part of which may be made thinner by forming grooves. The fluid flow passing through the intervalve flow path 19 reaches the shut off valve 5. When the shut off valve 5 is opened, the fluid flow enters into the outlet flow path 15 and the fluid outlet 14 and is introduced into a process chamber, etc. through an outlet 18. The outlet part 10a is an integral block and has a recess on the top surface thereof for receiving a lower portion of the actuator assembly 4. The outlet joint may be disposed separately from the outlet part 10a. However, it is preferred to incorporate the outlet joint as an integral part of the outlet part 10a in view of making the flow paths coaxial.

The metal diaphragm 42 is disposed via a metal O-ring 45 so as to cover the valve chamber 47. The periphery of the diaphragm 42 is pressed by a holding member 44 on which a housing 46 for an actuator 40 and a cap 48 are stacked and secured to the outlet part 10a by screw bolts. On the central flat area of the metal diaphragm 42, a diaphragm spacer 41 is disposed so as to transmit the pressing force from the actuator 40 to the metal diaphragm 42 via an aligning piezo spacer 49 and a bearing means 30. The actuator 40 is a piezo element laminate inserted in the housing 46 made of a metal such as a stainless steel, preferably a metal having an extremely small thermal expansion coefficient. The actuator 40 is made coaxial with the housing 46 by a housing cap 32 and a nut 33 which are screwed on the upper portion of the actuator 40. Before energizing the mass flow controller, the actuator 40 is maintained lifted by a spring 31 to keep the metal diaphragm 42 away from the sealing surface of the valve seat 43 by the self-restoring force of the diaphragm 42, i.e., the mass flow controller of FIGS. 1 and 2 is a normally opened type. When energizing the mass flow controller, the downward expansion of the actuator 40 presses the piezo spacer 49 and the diaphragm spacer 41 and moves them downward against the upward spring force from the spring 31. As a result thereof, the diaphragm 42 is forced to elastically deformed toward the sealing surface of the seat valve 43, thereby controlling the mass flow of the fluid.

Each part other than the metal diaphragm 42 is usually made of a stainless steel such as SUS316L, etc. The metal diaphragm 42 is made of a highly elastic metal material such as Co-based alloy, Ni-Co-based alloy, for example, an alloy comprising 13–18 weight % of Ni, 18–23 weight % of Cr, 5–9 weight % of Mo, 38–44 weight % of Co and balance of Fe and inevitable impurity, in view of providing a high corrosion resistance, a good endurance and a self-restoring force. Preferably, the metal diaphragm 42 is a circular thin plate with a diameter of 3.5–16 mm having a central flat area with a thickness of 0.10–0.30 mm. The central flat area is surrounded by an annular spring portion having a semicircular cross section (round cross section). Out side the spring portion, there exists a flat periphery to be held by the holding member 44. Generally, the metal diaphragm 42 is made from a stack of a plurality of thin plates using a molding die, and a circular thin plate made of the same material may be further integrally laminated on the central flat area by a spot welding or a suitable adhesive to enhance the rigidity.

As shown in FIGS. 1 and 2, the intermediate flow path 13 from the inlet flow path 12 is in fluid communication with the valve chamber 47 through the metal diaphragm 42, and the intervalve flow path 19 extends downward through the valve seat 43. At the downstream end of the intervalve flow path 19, the shut off valve 5, which is a two-way valve switching open/close or on/off functions, is incorporated as an integral part of the flow path body 10. The shut off valve 5 comprises a shut off valve seat 51 preferably made of a resin and caulked in a groove, a metal shut off diaphragm 52 and a cover 53. The metal shut off diaphragm 52 is usually made of a Ni-Co-based alloy. The central portion is in concavo-convex shape (segment of spherical shell) and the periphery around the central portion is flat. The flat periphery is held between a notched recess of the flow path body 10 and the screwed cover 53 so as to oppose the concave side of the metal shut off diaphragm 52 to a sealing surface of the shut off valve seat 51.

Normally, the concave recess of the metal shut off diaphragm 52 allows a fluid passing through the intervalve flow path 19 to enter into an outlet flow path 15 and a fluid outlet 14. When the metal shut off diaphragm 52 is pressed upward by a press means 54, for example air pressure, received by the cover 53, the metal shut off diaphragm 52 is gradually deformed toward the sealing surface of the shut off valve seat 51 and thereafter a large deformation occurs suddenly to completely close the sealing surface. When the pressing force from the press means 54 is removed, the metal shut off diaphragm 52 gradually moves away from the sealing surface by its elastic self-restoring force and thereafter restores to its initial position by a large elastic deformation which occurs suddenly. Thus, the shut off valve 5 of the present invention is simple in its construction and compact. Further, since the shut off valve 5 is a two-way type for controlling only the open and close functions and the concave side of the metal diaphragm is directly contact with the sealing surface, the fluid flow can be completely shut off even when the mass flow is large. Also, the shut off valve 5 includes no sliding portion and the surface area contacting with the fluid is small, the shut off valve 5 is inactive to the fluid and does not contaminate the fluid. The shut off valve 5 of mentioned above may be hereinafter referred to as a direct seal shut off valve.

The metal shut off diaphragm 52 is distinguishable from the metal diaphragm 42 for the mass flow control valve in both the geometric shape and the function. The metal diaphragm 42 has the central flat area and acquires the elastic self-restoring property by a spring portion surrounding the central flat area, whereas the central portion of the metal shut off diaphragm 52 is concavo-convex shape while opposing the concave side to the sealing surface of the shut off valve seat. The metal diaphragm 42 precisely controls the mass flow by changing the space between the central flat area and the sealing surface of the valve seat 43, while the metal shut off diaphragm 52 switches on/off modes by making the concave surface close contact with or separate from the sealing surface by a large elastic deformation.

As described above, the mass flow control valve and the shut off valve are disposed in the flow path body at the opposite positions with respect to the inlet flow path and the outlet flow path. Therefore, the dead space to entrap the remaining gas can be minimized to 0.01 cc or less. Also, since the direct seal shut off valve is simple in its structure and is compact, the mass flow controller of the present invention has a reduced size.

Figure 3:
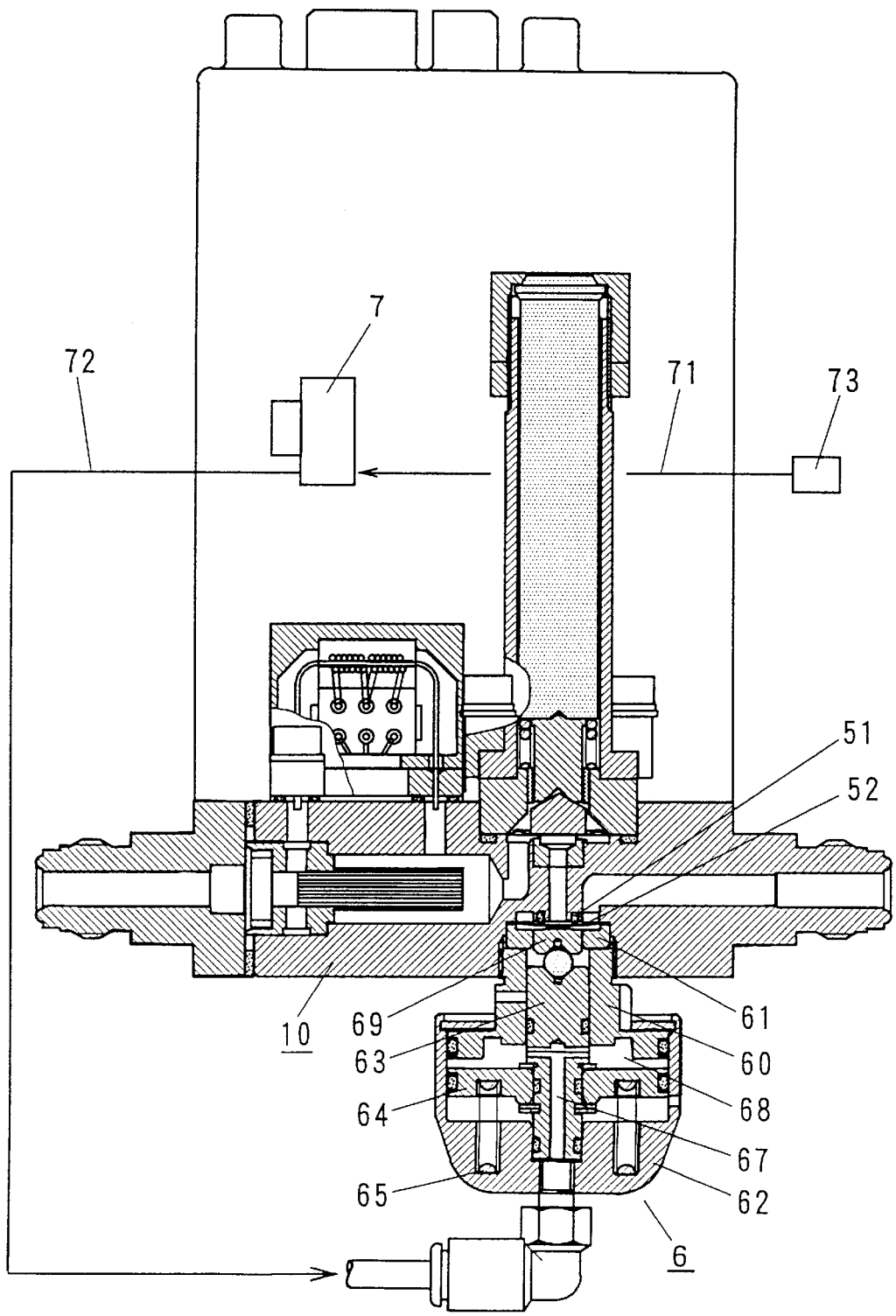
FIG. 3 is a vertical cross sectional view showing a modification of the first embodiment of the mass flow controller of the present invention.

FIG. 3 is a vertical cross sectional view showing a modification of the first preferred embodiment of the mass flow controller of the present invention. Since the portions other than the shut off valve 6 are substantially the same as in FIGS. 1 and 2, the description for such portions are omitted in FIG. 3. In the mass flow controller of FIG. 3, a cylinder mechanism is employed as the pressing means for opening and closing the shut off valve 6. A metal diaphragm 52 of the same geometric shape as in FIGS. 1 and 2 is held at its periphery between a notched recess of the flow path body 10 and a screwed cylinder shut off valve 6 via a diaphragm holder 61 while opposing a concave side of the metal diaphragm 52 to a shut off valve seat 51.

On a cover 60, a cylinder cover 62 is hermetically fitted. Each piston 64 is secured to a valve rod 63 by lock rings so as to be movable upward and downward in cooperation with the valve rod 63. Normally, the valve rod 63 is pushed toward the valve seat 51 by a spring 65. By the upward force from the spring 65, a pushing member 69 having a smooth surface is pushed toward the valve seat 51 via a ball to make the shut off valve closed. When air is introduced into a chamber 68 via a through hole 67, the air pressure moves the pistons 64 and the valve rod 63 downward. This moves the metal diaphragm 52 away from the shut off valve seat 51 to open the valve. In this manner, the valve rod 63 moves downward to open the shut off valve by air pressure, and moves upward to close the shut off valve when the air pressure is removed. Thus, the shut off valve shown in FIG. 3 is a normally closed type. However, the shut off valve 6 of the present invention may be a normally opened type in which the shut off valve is closed by applying air pressure and opened by removing the air pressure. The space between the metal diaphragm 52 and the shut off valve seat 51 is preselected so that the diaphragm 52 repeats the complete shut off and opening functions by elastic deformation within the elastic limit.

Like the mass flow controller of FIGS. 1 and 2, the mass flow controller of FIG. 3 also eliminates the overshoot flow, reduces the dead space thereby avoiding the waste entrapped gas and ensures a small size. Further, since the shut off valve uses a cylinder mechanism, the shut off force can be adjusted according to the application and the fluid flow can be completely shut off even when the mass flow is large.

The mass flow controller equipped with the shut off valve may be operated as mentioned below.

As best seen in FIG. 3, when an electrically driven electro-magnetic valve 7 is opened, a fluid flow such as air from a fluid source 73 flows through tubes 71, 72 into the chamber 68 of the shut off valve 6. The piston 64 and the valve rod 63 move downward by the fluid pressure against the upward spring force from the spring 65. This in turn moves the pushing member 69 downward to open the shut off valve due to the downward deformation of the diaphragm 52. In the operating method of the present invention, an electrical signal for controlling the opening and closing functions of the electro-magnetic valve 7 is input to the control circuit 3 together with the mass flow control signal from the sensor means 2. Both control signals are processed in the control circuit 3 into a single control signal to simultaneously control the mass flow control valve and the shut off valve.

There is a slight delay between the opening of the electro-magnetic valve 7 and the complete shutting off or opening of the shut off valve. This delay causes an amount of leakage of the fluid from the shut off valve into the outlet flow path 15 and a subsequent process chamber. Therefore, the control of the shut off valve should be made by taking a delay time of 0.1–0.2 second into consideration. The delay time is optimized prior to the initiation of the mass flow control operation depending on the internal volume of the tube 72 and the fluid pressure supplied by the fluid source 73. Since the internal volume and the fluid pressure are design conditions and previously known, the delay time can be easily determined. In this manner, the mass flow control valve can be controlled in close relation to the shut off valve while taking the delay time into consideration by a single control signal provided by the control circuit 3.

More specifically, the control circuit 3 includes, in addition to a circuit for controlling the sensor means 2 and a circuit for controlling the mass flow control valve, a circuit for controlling the opening and closing functions of the shut off valve, a delay circuit and a circuit for controlling the opening and closing functions of the electro-magnetic valve 7, thus simultaneously controlling the opening and closing functions of the mass flow control valve and the shut off valve while taking the delay time into consideration. For example, upon inputting an open signal (+15 V), −15 V for closing operation, to the circuit for controlling the opening and closing functions of the shut off valve, the electro-magnetic valve 7 is opened to allow the fluid such as air from the fluid source 73 to flow into the shut off valve 6, thereby opening the shut off valve 6 in a predetermined delay time. At the same time, the open signal is also input to the delay circuit. The delay circuit inputs a signal for opening the mass flow control valve with the predetermined delay time to the circuit for controlling the mass flow control valve, thus the mass flow control valve being opened after the predetermined delay time from the opening of the electro-magnetic valve 7.

Figure 4A:
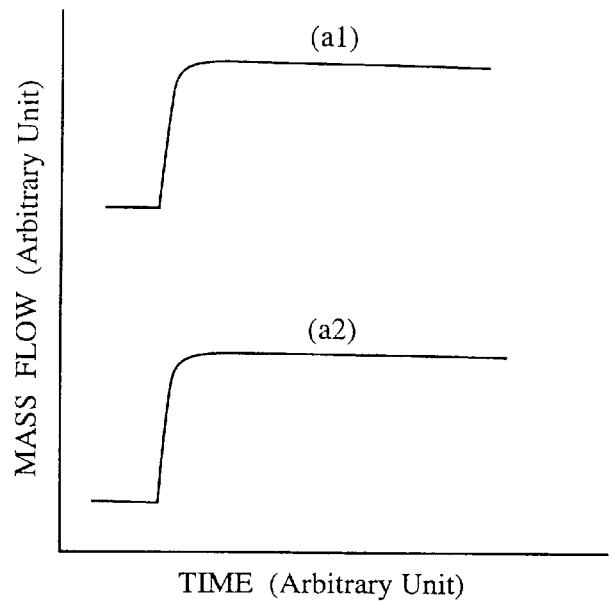
FIG. 4(a) is a graphic illustration showing a response curve of the mass flow controller of the present invention.
Figure 4B:
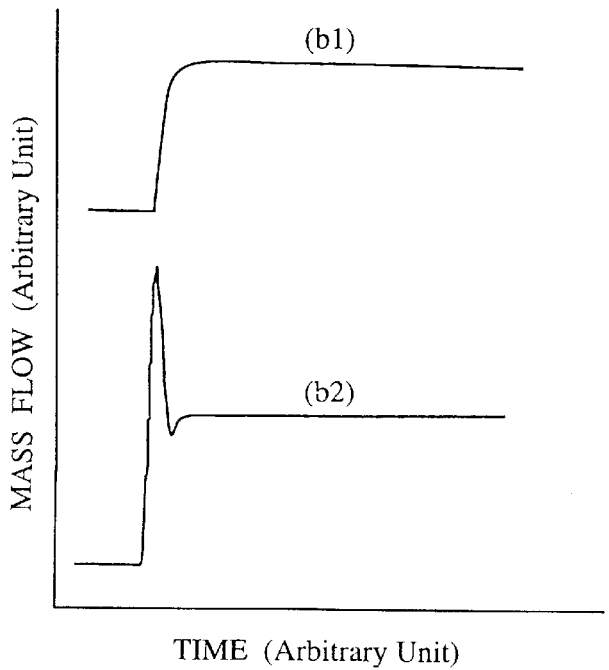
FIG. 4(b) is a graphic illustration showing a response curve of the conventional mass flow controller as shown in FIG. 11.
Figure 11:
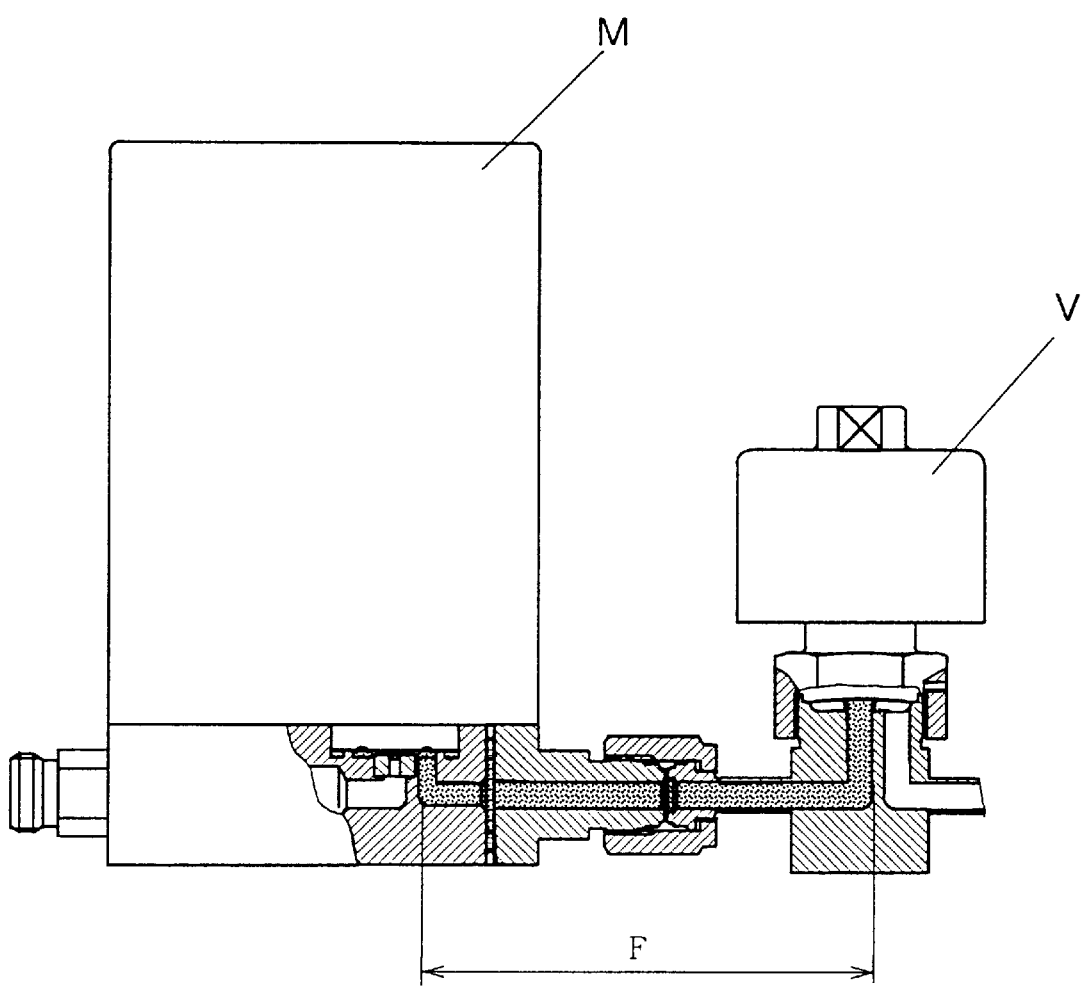
FIG. 11 is a partial cross sectional view showing a conventional combination of a mass flow controller and a shut off valve.
Figure 12:
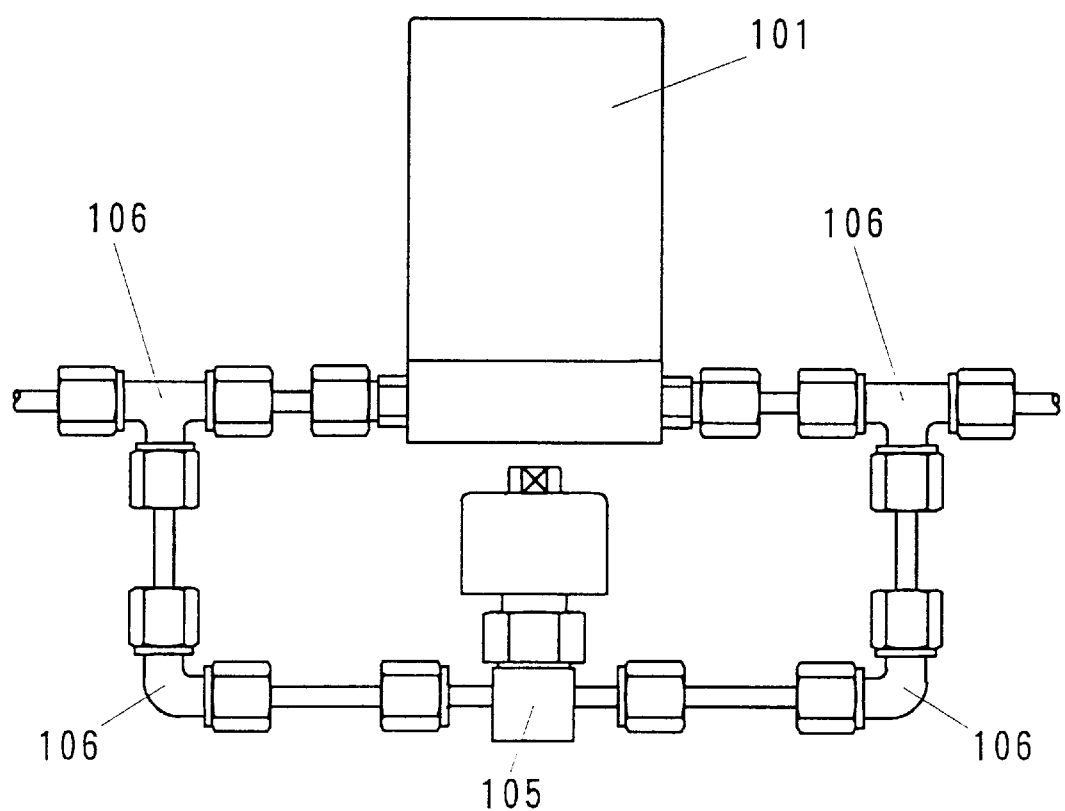
FIG. 12 is a schematic view showing a conventional combination of a mass flow controller and a bypass line for flowing a large mass flow.

FIG. 4(*a*) is a graphic illustration showing a response curve of the mass flow controller of the present invention, and FIG. 4(*b*) is a graphic illustration showing a response curve of the conventional mass flow controller as shown in FIG. 11. In FIGS. 4(*a*) and 4(*b*), each of the curves (a1) and (b1) shows an electrical output signal as a function of the detected mass flow provided by the sensor means. Each of the response curves (a2) and (b2) shows the mass flow actually measured. In the conventional mass flow controller, as seen from FIG. 4(*b*), upon receiving an electrical signal for opening the shut off valve and mass flow control valve, a large amount of fluid flows at the initial stage, i.e., the overshoot flow occurs as shown by the response curve (b2) due to the entrapped gas in the dead space between the mass flow control valve and the shut off valve, while the output signal (b1) shows no overshoot because the entrapped gas never passes through the sensor means. Thus, in the conventional mass flow controller, the output signal of the mass flow provided by the sensor means is not consistent with the actually measured mass flow. On the other hand, the response curve (a2) shows no overshoot because the dead space is minimized in the present invention. Also, upon comparing the output signal (a1) and the response curve (a2), it can be seen that the response time is quite short, about one second or shorter, and that the output signal of the mass flow provided by the sensor means is well consistent with the actually measured mass flow.

Figure 5:
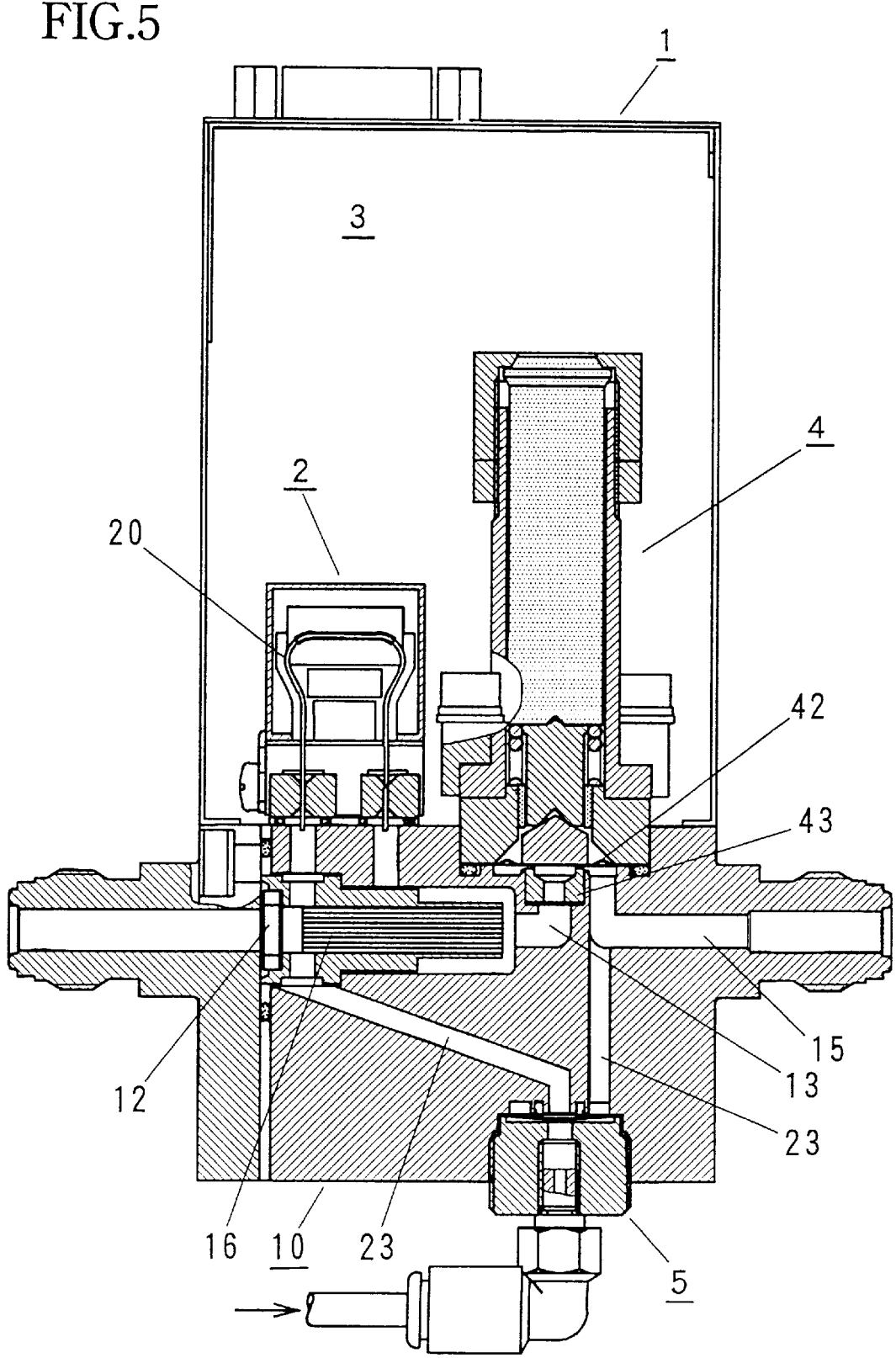
FIG. 5 is a vertical cross sectional view showing a second embodiment of the mass flow controller of the present invention.
Figure 6:
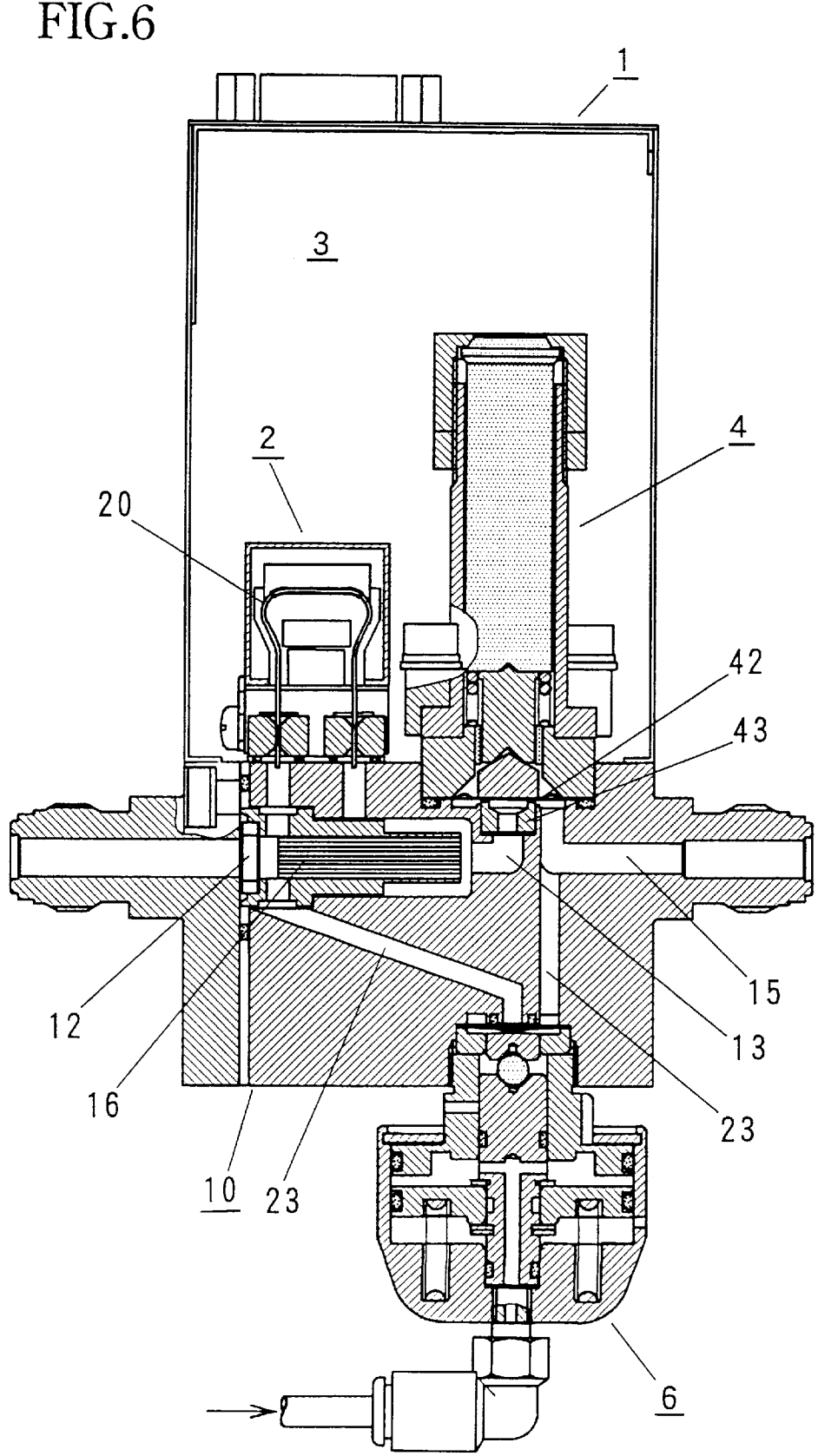
FIG. 6 is a vertical cross sectional view showing a modification of the second embodiment of the mass flow controller of the present invention.

FIG. 5 is a vertical cross sectional view showing a second embodiment of the mass flow controller of the present invention. FIG. 6 is a vertical cross sectional view showing a modification of the second embodiment. The mass flow controllers of FIGS. 5 and 6 are practically the same as in the mass flow controller of FIG. 1 as far as the sensor means 2, the control circuit 3, the actuator assembly 4, the mass flow control valve and the shut off valve 5 or 6 are concerned.

Most characteristic feature of the mass flow controllers of FIGS. 5 and 6 is a bypass passage 23 between an inlet flow path 12 before branching into a sensor flow path 20 and a bypass flow path 16 and an outlet flow path 15 after the mass flow control valve. The bypass passage 23 has a shut off valve 5 or 6 midway between the upstream and downstream ends thereof.

As seen from FIGS. 5 and 6, an intermediate flow path 13 of the mass flow controller 1 has a valve seat 43 made of a metal at the downstream end thereof and communicates with a valve chamber partitioned by a metal diaphragm 42. The outlet of the mass flow control valve is connected to an outlet flow path 15. The bypass passage 23 between the inlet flow path 12 and the outlet flow path 15 bypasses the bypass flow path 16, the sensor flow path 20 and the mass flow control valve comprising the valve seat 43, the metal diaphragm 42 and the valve chamber. The opening and closing functions of the bypass passage 23 are controlled by the shut off valve disposed integrally to the flow path body 10. As the shut off valve, the direct seal shut off valve 5 as shown in FIGS. 1 and 2 and the cylinder shut off valve 6 as shown in FIG. 3 may be used. The mass flow control valve and the shut off valve in this embodiment may be simultaneously controlled in the same manner as described above.

With the mass flow controller having the bypass passage 23, a purge gas of a large mass flow can be passed through the mass flow controller in a short time because the bypass flow path 16 and the sensor flow path 20, which generates a large flow resistance, can be bypassed. In particular, the bypass passage 23 is extremely effective to sufficiently purge a mass flow controller having a small maximum controllable mass flow of 10 SCCM or less. Further, the bypass passage 23 and the shut off valve 5 or 6 are incorporated in the flow path body 10 together with the mass flow control valve as the integral parts, the mass flow controller is compact in its size and the production cost thereof can be reduced.

Figure 7:
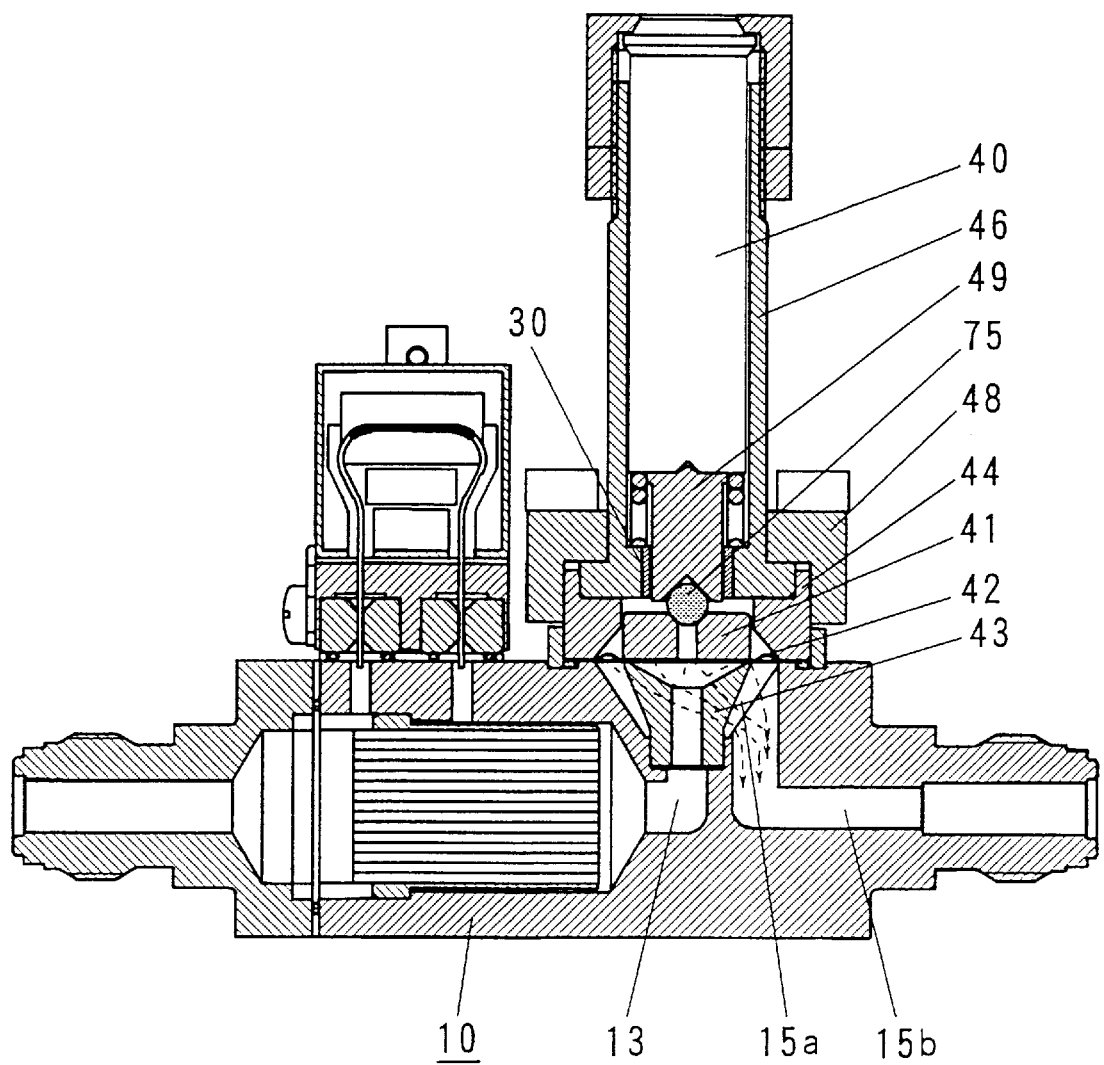
FIG. 7 is a vertical cross sectional view showing a third embodiment of the mass flow controller of the present invention.
Figure 8:
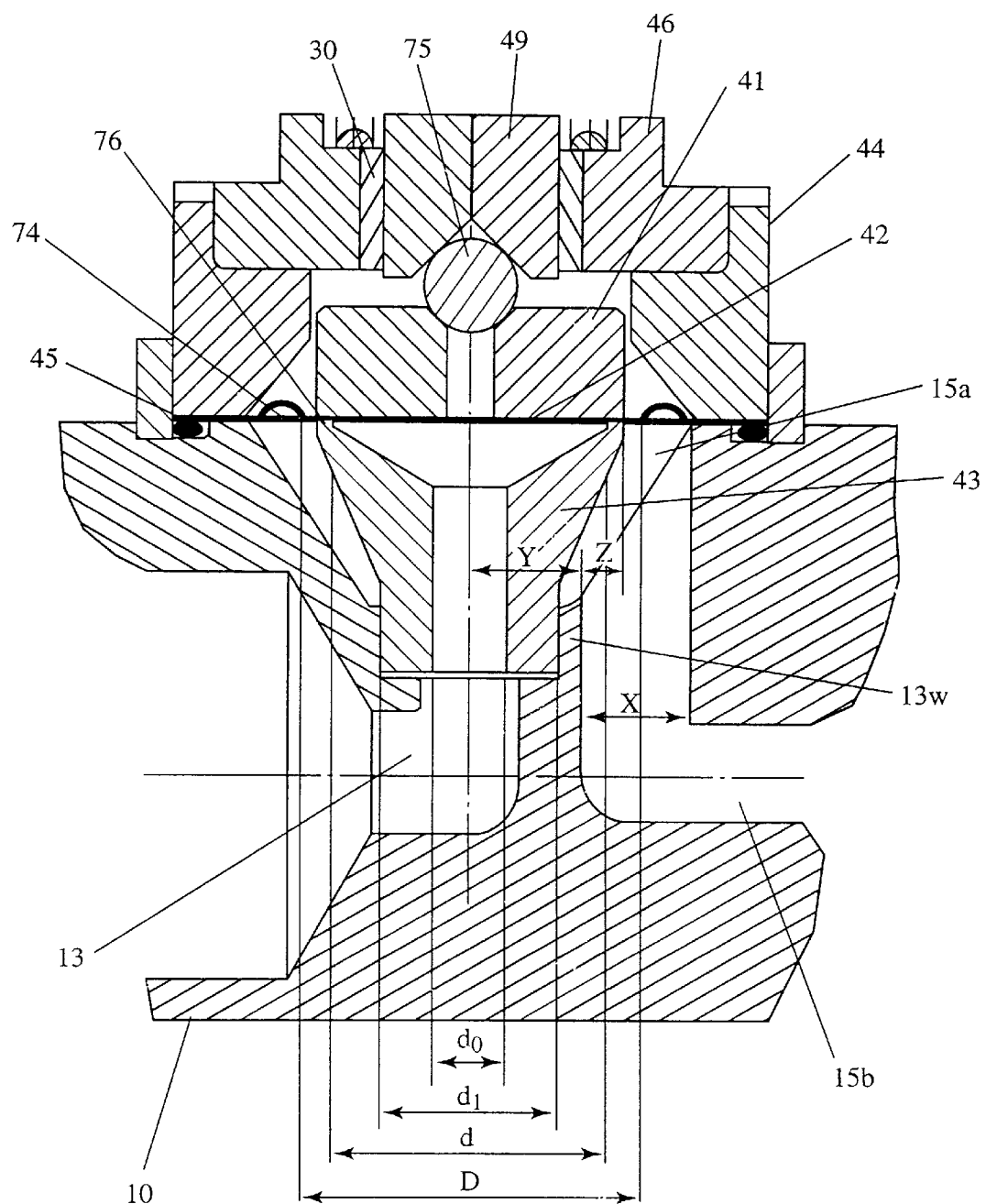
FIG. 8 is an enlarged view showing an important part of FIG. 7.

Each of FIGS. 7 and 8 is a cross sectional view showing a third embodiment of the mass flow controller of the present invention. The mass flow controllers of FIGS. 7 and 8 are practically the same as in the mass flow controller of FIG. 1 with respect to the sensor means 2, the control circuit 3, and the actuator assembly 4.

As seen from FIGS. 7 and 8, the valve seat 43 is disposed at the downstream end of the intermediate flow path 13, and the metal diaphragm 42 is opposed to the sealing surface of the valve seat 43 so that the diaphragm 42 moves toward the sealing surface to close the valve seat 43 and moves away from the sealing surface to control the degree of opening of the valve seat 43. Around the valve seat 43, the flow path 15*a* from the sealing surface of the valve seat 43 extends. The valve seat 43 is mounted on the inner surface of the flow path 15*a*. The flow path 15*a* is bent at 90° and connected to the outlet flow path 15*b*.

The flow path body 10 has a recess on the top thereof for receiving the valve seat 43, the recess being communicated with the sealing surface of the valve seat 43 and the flow path 15*a*. On the top surface of the flow path body 10, the diaphragm 42 is mounted via the metal O-ring 45 and a valve seat spacer 74 (about 80 $\mu$m) so as to completely cover the recess on the top of the body 10. The periphery of the diaphragm 42 is pressed onto the top surface of the body 10 by the holding member 44 on which the housing 46 for an actuator and a cap 48 are stacked and secured to the body 10 by screw bolts. On the metal diaphragm 42, a diaphragm spacer 41 is mounted so as to transmit the pressing force from the piezo actuator 40 to the diaphragm 42 via an aligning spherical ball 75, a piezo spacer 49 and a bearing means 30.

One of the characteristic features of this embodiment is in that the sealing surface of the valve seat 43 and the top surface of the flow path body 10 at least around the recess are made coplanar so that the sealing surface and the top surface of the body 10 may be simultaneously subjected to a lapping finish after mounting the valve seat 43 into the body 10. Generally, since the lapping finish provides a mirror surface of about 0.2 S, a metal O-ring surface with a good seal capability for mounting the sensor means 2 can be also obtained in a single lapping step thereby enhancing the productivity.

Figure 10:
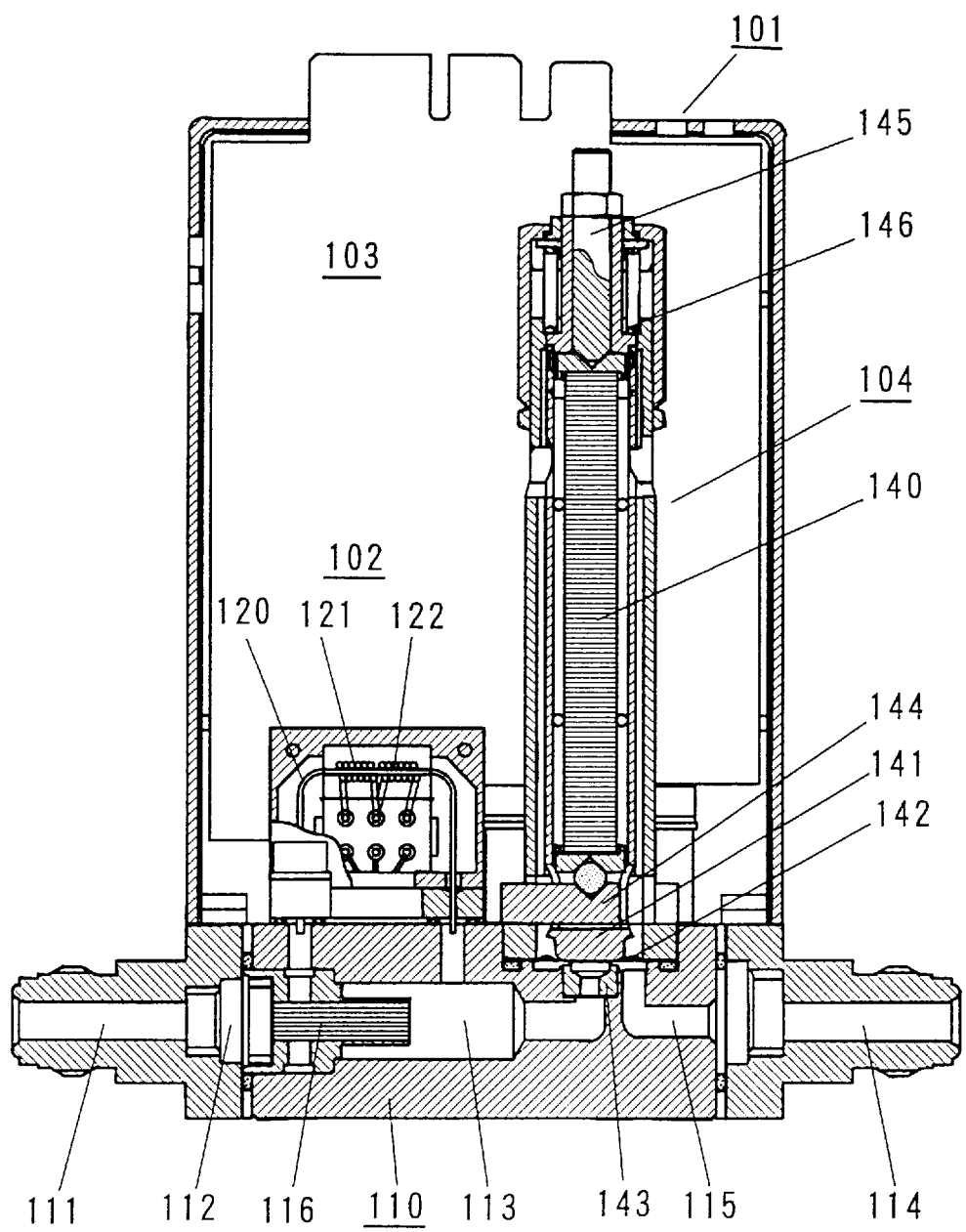
FIG. 10 is a vertical cross sectional view showing a conventional mass flow controller.

The coplanarity between the sealing surface of the valve seat 43 and the top surface of the body 10 enables a parallel stacking of the diaphragm 42, the holding member 44, etc. on the sealing surface of the valve seat 43 and make the axes of the valve seat 43, the diaphragm 42, etc. well aligned with the axis of the actuator 40. Therefore, the stroke of motion of the actuator 40 is accurately transmitted to the diaphragm 42. In addition, since the flat area of the diaphragm 42 moves toward or away from the sealing surface of the valve seat 43 while maintaining the parallel relationship, the precise control of the mass flow can be attained. Further, since the valve seat 43, the diaphragm 42, the holding member 44, etc. are located nearer the top surface of the flow path body 10 as compared with the known mass flow controller, the valve chamber can be eliminated to reduce the size of the mass flow controller. For example. the length L (length between the inlet and the outlet) was about 106 mm in the mass flow controller of FIG. 7, whereas about 124 mm in the mass flow controller of FIG. 10.

As best shown in FIG. 8, the inner surface of the valve seat 43 is inversely tapered toward the sealing surface, and the circular sealing surface 76 with a width of w of the valve seat 43 contacts with the outer periphery of the central flat area of the diaphragm 42. The conical flow path 15a for passing the fluid flow from the valve seat 43 extends downward along the tapered outer surface of the valve seat 43. The thickness of the wall between the valve seat 43 and the flow path 15b is preferred to be sufficiently thin so that the inner diameter (d) of the sealing surface 76 and the shortest distance (Y) between the axis of the valve seat 43 and the flow path 15b always satisfy the relationship of $d/2 \geq Y$.

In the present invention, the outer diameter ($d_1$) of the cylindrical portion of the valve seat 43 is preferably 5–10 mm, the inlet inner diameter ($d_0$) of the valve seat 43 is preferably 3–6 mm, the inner diameter (d) is preferably 10–15 mm, the width (w) of the sealing surface of 76 is 0.1–1 mm and the distance (Y) is preferably 3.5–6 mm. In the specific example as shown in FIGS. 7 and 8, $d_1$ was 7.2 mm, $d_0$ was 4.0 mm, d was 13.6 mm, w was 0.2 mm, Y was 4.45 mm, the diameter (X) of the flow path 15b was 4.5 mm and the overlapping length (Z) between the opening of the valve seat 43 and the inner wall 13w was 2.55 mm. The inner diameter of the sealing surface of the known valve seat is usually 5.0 mm, and therefore, it was expected that a mass flow 2.4 times larger than that of the conventional mass flow controller was obtained by the mass flow controller shown in FIGS. 7 and 8. However, the actual measurement showed that the mass flow about 4 times was obtained. Thus, with the mass flow control valve means shown in FIGS. 7 and 8, a large flow mass can be obtained because the circumferential length of the sealing surface is elongated and the fluid flow passes with a little flow resistance into the flow path 15a from the entire periphery of the sealing surface of the valve seat 43.

In the above specific example, the inner diameter (d) of the sealing surface of the valve seat 43 was 0.89 time the diameter (D) of the central flat area of the diaphragm 42. Preferably, the inner diameter (d) is 0.7 D to D. By regulating the inner diameter (d) and the diameter (D) within the above range, the valve seat 43 is sealed by the peripheral portion of the central flat area of the diaphragm 42. Since the peripheral portion of the central flat area moves only a small distance, the diaphragm 42 is brought into close contact with the sealing surface 76 by a small pressing force to enhance the seal capability of the valve seat 43.

Figure 9:
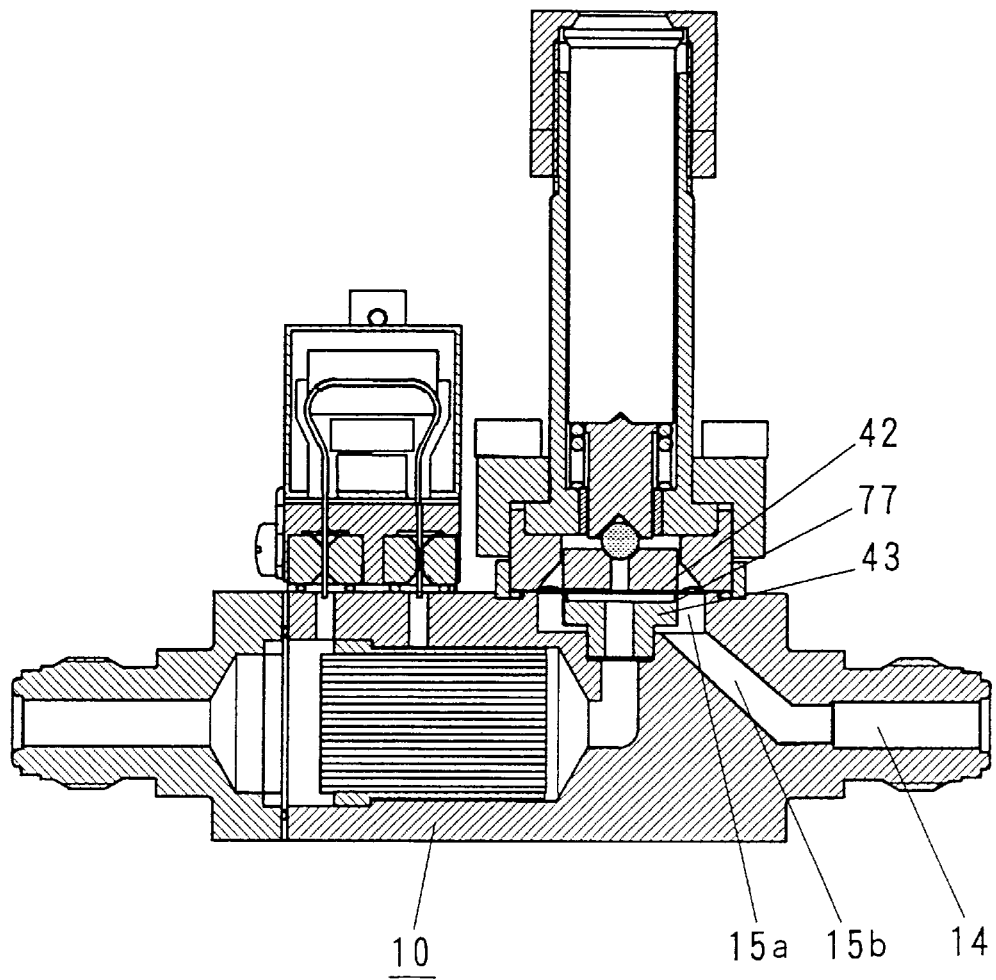
FIG. 9 is a vertical cross sectional view showing a modification of the third embodiment of the mass flow controller of the present invention.

FIG. 9 is a vertical cross sectional view showing a modification of the mass flow controller shown in FIGS. 7 and 8. The valve seat 43 has an upper annular projection 77, at the periphery of the top thereof. The top surface of the projection 77 defines the sealing surface of the valve seat 43, the sealing surface being made into coplanar with the top surface of the flow path body 10 and brought into close contact with the peripheral portion of the central flat area of the diaphragm 42. The fluid flow from the sealing surface enters into the flow path 15a through the entire periphery of the sealing surface. The lower cylindrical portion of the valve seat 43, at which the valve seat 43 is mounted to the flow path body 10, has an outer diameter smaller than that of the sealing surface. The flow path 15a is connected to an outlet flow path 15b which extends obliquely toward the fluid outlet 14 to ensure an easy flow. In this specific example, the inner diameter (d) of the sealing surface was 0.90 D. With the above construction, the same results as obtained by the mass flow controller of FIGS. 7 and 8 can be obtained, namely, a mass flow controller of a compact size and having a large maximum controllable mass flow can be obtained. It should be appreciated that the mass flow controller of the third embodiment may be incorporated by the shut off valve of the first embodiment or the bypass passage having the shut off valve of the second embodiment into the flow path body thereof as integral parts.

As described above, the present invention has the following advantages:

(1) According to the first embodiment of the present invention, since the mass flow control means and the shut off valve means are incorporated into the flow path body as the integral parts, the dead space between the mass flow control valve and the shut off valve can be minimized and the amount of the entrapped gas therein can be extremely reduced. Therefore, the occurrence of overshoot can be avoided and the mass flow well responsive to the control signals can be obtained. Further, the amount of the waste gas is extremely reduced and the time for expelling the entrapped gas from the mass flow controller system can be shortened. In addition, the cylinder cabinet of the apparatus for producing semiconductor devices can be reduced in its size.

(2) According to the second embodiment of the present invention, the mass flow control mode and the purge mode can be easily switched. Since a large amount of purge gas can be passed through the mass flow controller in a short period of time, both the required time for sufficient purge and the amount of purge gas can be reduced to reduce the production cost of semiconductor devices and minimize the occurrence of defective semiconductor devices.

(3) According to the operating method of the present invention, the shut off valve can be controlled in close relation to the mass flow control valve because the control signal for the shut off valve is built in the control signal for the mass flow controller.

(4) According to the third embodiment of the present invention, since the top surface of the flow path body and the sealing surface of the valve seat can be simultaneously subjected to lapping finish, the top surface of the flow path body and the sealing surface are in good parallel relationship to each other. Therefore, the axis of the actuator can be well aligned with the axes of other parts to effectively transmit the stroke of motion of the actuator to the diaphragm. Further, since the length of the sealing surface is elongated and the flow resistance is reduced, a mass flow controller having a large maximum controllable mass flow can be obtained.

What is claimed is:

1. A mass flow controller comprising:

a flow path body having therein an inlet flow path which is branched into a sensor flow path and a bypass flow path, an intermediate flow path in fluid communication with downstream ends of said bypass flow path and said sensor flow path, a downstream end of said intermediate flow path being connected to a mass flow control valve, and an outlet flow path for flowing a fluid from said mass flow control valve;

a sensor means for detecting a mass flow of said fluid passing through said sensor flow path;

a control circuit for controlling said mass flow control valve and said sensor means; and a shut off valve for opening or closing a flow path from said mass flow control valve to said outlet flow path is disposed in said flow path body and is closely spaced to and in axial alignment with said mass flow control valve to provide a short flow path therebetween.

2. The mass flow controller according to claim 1, wherein said shut off valve comprises a metal concavo-convex diaphragm disposed so as to close said shut off valve by press contacting a concave side of said diaphragm with a valve seat or open said shut off valve by moving said diaphragm away from said valve seat, and a press means for operating opening and closing functions of said diaphragm by applying or removing a fluid pressure on said diaphragm.

3. The mass flow controller according to claim 1, wherein said shut off valve comprises a metal concavo-convex diaphragm disposed so as to close said shut off valve by press contacting a concave side of said diaphragm with a valve seat or open said shut off valve by moving said diaphragm away from said valve seat, and a press means for operating opening and closing functions of said diaphragm by applying or removing a pressure from a cylinder on said diaphragm, said cylinder being operated by a fluid pressure.

4. The mass flow controller according to claim 1, wherein said mass flow control valve comprises:

a valve seat disposed at the downstream end of said intermediate flow path and received in a recess on a top of said flow path body; and a metal diaphragm having a central flat area and disposed so as to adjust the degree of opening of said valve seat by moving toward and away from a sealing surface of said valve seat, the moving of said diaphragm being operated by an actuator assembly by applying or removing a pressure on said diaphragm, a lower portion of said actuator assembly being located on said diaphragm; said sealing surface of said valve seat being made nearly coplanar with a top surface of said flow path body at least around said recess.

5. The mass flow controller according to claim 4, wherein said actuator means includes a piezo actuator.

6. The mass flow controller according to claim 1, wherein a control for shutting off and opening said shut off valve is linked to a control for adjusting an opening of said mass flow control valve by building a control signal for said shut off valve in said control circuit and providing a single control signal for controlling both said shut off valve and said mass flow control valve.

7. A mass flow controller comprising:

a flow path body having therein an inlet flow path which is branched into a sensor flow path and a bypass flow path, an intermediate flow path in fluid communication with downstream ends of said bypass flow path and said sensor flow path, a downstream end of said intermediate flow path being connected to a mass flow control valve, and an outlet flow path for passing a fluid from said mass flow control valve;

a sensor means for detecting a mass flow of said fluid passing through said sensor flow path;

a control circuit for controlling said mass flow control valve and said sensor means; and a bypass passage for communicating said inlet flow path and said outlet flow paths having a shut off valve for opening or closing said bypass, is disposed in said flow path body;

wherein said bypass passage has an upstream end located at said inlet flow path and a downstream end located at said shut off valve.

8. The mass flow controller according to claim 7, wherein said shut off valve comprises a metal concavo-convex diaphragm disposed so as to close said shut off valve by press contacting a concave side of said diaphragm with a valve seat or open said shut off valve by moving said diaphragm away from said valve seat, and a press means for operating opening and closing functions of said diaphragm by applying or removing a fluid pressure on said diaphragm.

9. The mass flow controller according to claim 7, wherein said shut off valve comprises a metal concavo-convex diaphragm disposed so as to close said shut off valve by press contacting a concave side of said diaphragm with a valve seat or open said shut off valve by moving said diaphragm away from said valve seat, and a press means for operating opening and closing functions of said diaphragm by applying or removing a pressure from a cylinder on said diaphragm, said cylinder being operated by a fluid pressure.

10. The mass flow controller according to claim 7, wherein said mass flow control valve comprises:

a valve seat disposed at the downstream end of said intermediate flow path and received in a recess on a top of said flow path body; and a metal diaphragm having a central flat area and disposed so as to adjust the degree of opening of said valve seat by moving toward and away from a sealing surface of said valve scat, the moving of said diaphragm being operated by an actuator assembly by applying or removing a pressure on said diaphragm, a lower portion of said actuator assembly being located on said diaphragm; said sealing surface of said valve seat being made nearly coplanar with a top surface of said flow path body at least around said recess.

11. The mass flow controller according to claim 10, wherein said actuator means includes a piezo actuator.

12. The mass flow controller according to claim 7, wherein a control for shutting off and opening said shut off valve is linked to a control for adjusting an opening of said mass flow control valve by building a control signal for said shut off valve in said control circuit and providing a single control signal for controlling both said shut off valve and said mass flow control valve.

13. A method of operating a mass flow controller, the method comprising:

a flow path body having therein an inlet flow path which is branched into a sensor flow path and a bypass flow path, an intermediate flow path in fluid communication with downstream ends of said bypass flow path and said sensor flow path, a downstream end of said intermediate flow path being connected to a mass flow control valve, and an outlet flow path for flowing a fluid from said mass flow control valve, wherein a shut off valve for opening or closing a flow path from said mass flow control valve to said outlet flow path is disposed in said flow path body;

detecting with a sensor a mass flow of said fluid passing through said sensor flow path;

controlling with a control circuit said mass flow control valve and said sensor means;

linking a control for shutting off and opening said shut off valve to a control for adjusting an opening of said mass flow control valve by building a control signal for said shut off valve in said control circuit; and providing a single control signal for controlling both said shut off valve and said mass flow control valve.

14. The method according to claim 13, providing a time delay for opening the control valve after said shut off valve is opened.

15. A method of operating a mass flow controller, the method comprising:

a flow path body having therein an inlet flow path which is branched into a sensor flow path and a bypass flow path, an intermediate flow path in fluid communication with downstream ends of said bypass flow path and said sensor flow path, a downstream end of said intermediate flow path being connected to a mass flow control valve, and an outlet flow path for passing a fluid from said mass flow control valve, wherein a bypass passage for communicating said inlet flow path and said outlet flow path having a shut off valve for opening or closing said bypass passage is disposed in said flow path body;

detecting with a sensor a mass flow of said fluid passing through said sensor flow path;

controlling with a control circuit said mass flow control valve and said sensor means;

linking a control for shutting off and opening said shut off valve to a control for adjusting an opening of said mass flow control valve by building a control signal for said shut off valve in said control circuit; and providing a single control signal for controlling both said shut off valve and said mass flow control valve.

16. The method according to claim 15, providing a time delay for opening the control valve after said shut off valve is opened.

17. A mass flow controller comprising:

a flow path body having therein an inlet flow path which is branched into a sensor flow path and a bypass flow path, an intermediate flow path in fluid communication with downstream ends of said bypass flow path and said sensor flow path, a downstream end of said intermediate flow path being connected to a mass flow control valve, and an outlet flow path for passing a fluid from said mass flow control valve, said mass flow control valve comprising (1) a valve seat disposed at the downstream end of said intermediate flow path and received in a recess on the top of said flow path body and (2) a metal diaphragm having a central flat area and disposed so as to adjust the degree of opening of said valve seat by moving toward and away from a sealing surface of said valve seat, the moving of said diaphragm being operated by an actuator assembly by applying or removing a pressure on said diaphragm, a lower portion of said actuator assembly being located on said diaphragm;

a sensor means for detecting a mass flow of a fluid passing through said sensor flow path; and a control circuit for controlling said mass flow control valve and said sensor means;

wherein said sealing surface of said valve seat being made coplanar with a top surface of said flow path body at least around said recess, where said recess is in a plane below said top surface.

18. The mass flow controller according to claim 17, wherein an inner diameter (d) of said sealing surface and a diameter (D) of said central flat area of said diaphragm satisfy the relationship of $0.7\,D \leq d \leq D$.

* * * * *